(12) United States Patent
Kerr et al.

(10) Patent No.: US 9,464,669 B2
(45) Date of Patent: Oct. 11, 2016

(54) DUPLEX BEARING LUBRICATION

(71) Applicant: United Technologies Corporation, Hartford, CT (US)

(72) Inventors: Donald L. Kerr, San Diego, CA (US); Eric A. Nager, El Cajon, CA (US); Giri Prakash Devalapally, San Diego, CA (US)

(73) Assignee: United Technologies Corporation, Farmington, CT (US)

( * ) Notice: Subject to any disclaimer, the term of this patent is extended or adjusted under 35 U.S.C. 154(b) by 1009 days.

(21) Appl. No.: 13/646,961

(22) Filed: Oct. 8, 2012

(65) Prior Publication Data

US 2014/0099199 A1    Apr. 10, 2014

(51) Int. Cl.
| | |
|---|---|
| F16C 33/66 | (2006.01) |
| F01D 25/16 | (2006.01) |
| F01D 25/18 | (2006.01) |
| F16C 35/063 | (2006.01) |
| F16C 19/18 | (2006.01) |
| F16C 19/50 | (2006.01) |
| F16C 33/60 | (2006.01) |

(52) U.S. Cl.
CPC ......... *F16C 33/6677* (2013.01); *F01D 25/166* (2013.01); *F01D 25/186* (2013.01); *F16C 35/063* (2013.01); *F16C 19/183* (2013.01); *F16C 19/505* (2013.01); *F16C 33/60* (2013.01); *F16C 2360/23* (2013.01); *Y10T 29/49679* (2015.01)

(58) Field of Classification Search
CPC .... F01D 25/16; F01D 25/18; F16C 33/6677; F16C 19/56; F05D 2240/50; F02C 7/06
USPC .................................. 415/111, 112, 229, 175
See application file for complete search history.

(56) References Cited

U.S. PATENT DOCUMENTS

| | | | |
|---|---|---|---|
| 5,106,209 A | | 4/1992 | Atkinson et al. |
| 5,247,855 A | * | 9/1993 | Alten .................... F16C 35/077 |
| | | | 384/536 |
| 6,409,464 B1 | * | 6/2002 | Fisher ..................... F01D 25/16 |
| | | | 384/475 |

(Continued)

FOREIGN PATENT DOCUMENTS

| | | |
|---|---|---|
| JP | 08200379 | 8/1996 |
| JP | 2011094769 A | 5/2011 |
| WO | 2005065833 A1 | 7/2005 |

OTHER PUBLICATIONS

International Search Report and Written Opinion for PCT/US2013/056309, dated Jan. 16, 2014.

(Continued)

*Primary Examiner* — Christopher Verdier
*Assistant Examiner* — Juan G Flores
(74) *Attorney, Agent, or Firm* — Bachman & LaPointe, P.C.

(57) ABSTRACT

A bearing system has first and second bearings each having an inner race. The inner races are mounted to a shaft. The first bearing inner race has a plurality of first ports. The second bearing inner race has a plurality of second ports. The shaft is insertable into the inner races in a plurality of orientations and has a plurality of outer diameter (OD) channels positioned to cooperate with at least the first bearing inner race to communicate with at least some of the first ports and at least some of the second ports. Regardless of said installed orientation, at least one of the second ports are in communication with at least one said inlet port along a flowpath bypassing all the first ports.

27 Claims, 7 Drawing Sheets

(56) References Cited

U.S. PATENT DOCUMENTS

| | | |
|---|---|---|
| 6,511,228 B2 | 1/2003 | Dusza |
| 6,814,537 B2 | 11/2004 | Olsen |
| 7,861,827 B2 | 1/2011 | Madge et al. |
| 8,439,569 B2 | 5/2013 | Ito et al. |
| 2006/0062504 A1 | 3/2006 | Wilton et al. |
| 2006/0153483 A1* | 7/2006 | Bridges ............ F01D 25/16 384/475 |
| 2009/0252604 A1 | 10/2009 | Alexander et al. |
| 2010/0021099 A1 | 1/2010 | Torii |
| 2012/0189235 A1 | 7/2012 | McNeil et al. |

OTHER PUBLICATIONS

Canadian Office action for Canadian Patent Application No. 2,886,509, dated Jan. 6, 2016.

European Search Report for EP Patent Application No. 13844651.3, dated May 25, 2016.

* cited by examiner

DUPLEX BEARING LUBRICATION

BACKGROUND

The disclosure relates to bearing lubrication. More particularly, the disclosure relates to lubrication of duplex bearings.

Bearings are used extensively in turbo-machines. Rolling element bearings typically include a circumferential array of rolling elements such as balls or rollers. Duplex bearings are typically used when more than mere radial loads are involved. In general, duplex bearings can be used to resist twisting moments normal to the bearing axis. Additionally, particular duplex bearings may be used to absorb axial loads (e.g., thrust loads). When lubricating a duplex bearing, lubricant (e.g., oil) must be delivered to both bearings, typically requiring separate passageways associated with the respective bearings.

SUMMARY

One aspect of the disclosure involves a bearing system having first and second bearings each having an inner race. The inner races are mounted to a shaft. The first bearing inner race has a plurality of first ports. The second bearing inner race has a plurality of second ports. The shaft is insertable into the inner races in a plurality of orientations and has a plurality of outer diameter (OD) channels positioned to cooperate with at least the first bearing inner race to communicate with at least some of the first ports and at least some of the second ports. Regardless of said installed orientation, at least one of the second ports are in communication with at least one said inlet port along a flowpath bypassing all the first ports.

In additional or alternative embodiments of any of the foregoing embodiments, the first bearing inner race and the second bearing inner race may be portions of a single piece.

In additional or alternative embodiments of any of the foregoing embodiments, the first bearing may include an outer race and a plurality of bearing elements between the outer race of the first bearing and the inner race of the first bearing. The second bearing may include an outer race and a plurality of bearing elements between the outer race of the second bearing and the inner race of the second bearing.

In additional or alternative embodiments of any of the foregoing embodiments, the first bearing bearing elements are balls; and the second bearing bearing elements are balls.

In additional or alternative embodiments of any of the foregoing embodiments, the first ports have outlets axially outboard of a transverse centerplane of the first bearing elements; and the second ports have outlets axially outboard of a transverse centerplane of the second bearing bearing elements.

In additional or alternative embodiments of any of the foregoing embodiments, the passageways extend from an inlet plenum at a shoulder of the shaft.

In additional or alternative embodiments of any of the foregoing embodiments, the OD channels comprise: a plurality of first bearing longitudinal legs; a plurality of first bearing circumferential legs intersecting respective associated first bearing longitudinal legs; a plurality of second bearing longitudinal legs; and at least one second bearing circumferential leg intersecting the second bearing longitudinal legs.

In additional or alternative embodiments of any of the foregoing embodiments: the plurality of first bearing circumferential legs are partial annuli; and the plurality of second bearing longitudinal legs pass between associated pairs of the first bearing circumferential legs.

In additional or alternative embodiments of any of the foregoing embodiments, the plurality of first bearing circumferential legs comprise at least two different angular spans.

In additional or alternative embodiments of any of the foregoing embodiments, the second bearing circumferential leg is a full annulus.

In additional or alternative embodiments of any of the foregoing embodiments, the system includes six first ports evenly circumferentially spaced.

In additional or alternative embodiments of any of the foregoing embodiments, the system includes four second bearing circumferential legs.

Another aspect of the disclosure involves an engine comprising an engine case and the bearing system of any of the foregoing embodiments wherein the shaft is an engine shaft and the first bearing and second bearing mount the shaft to the case for rotation about an engine axis.

In additional or alternative embodiments of any of the foregoing embodiments, the bearing system is at a forward end of the engine and the engine further comprises one or more additional bearings aft thereof.

In additional or alternative embodiments of any of the foregoing embodiments, the bearing system is at a forward end of the engine; and the passageways extend from a plenum proximate a connection to a coupling between the shaft and a load.

Another aspect of the disclosure involves a method for using the bearing system. The method includes delivering pressurized lubricant to a shoulder region of the shaft to pass into passageways formed by the OD channels and first bearing inner race and second bearing inner race to pass to the first ports and second ports.

In additional or alternative embodiments of any of the foregoing embodiments, the system is a duplex bearing system of a gas turbine engine, the method further comprising running the gas turbine engine to drive rotation of a rotor containing the shaft about an engine axis.

In additional or alternative embodiments of any of the foregoing embodiments the system includes: at least one first channel dimensioned to potentially feed one or more of the first ports; and at least one second channel dimensioned to potentially feed one or more of the second ports.

In additional or alternative embodiments of any of the foregoing embodiments, the at least one second channel comprises at least one circumferential leg and at least one longitudinal leg.

In additional or alternative embodiments of any of the foregoing embodiments, said at least one first channel is dimensioned to not be able to potentially feed any of the second ports.

Another aspect of the disclosure involves method for manufacturing a plurality of bearing systems according to any of the foregoing embodiments. The method includes, for a first said system, mounting the inner races of the first bearing and second bearing to the shaft in a first relative orientation wherein all of the second ports are in communication with the second channels and none of the first ports are and all of the first ports are in communication with the first channels and none of the second ports are. The method includes, for a second said system, mounting the inner races of the first bearing and second bearing to the shaft in a second relative orientation offset from the first relative orientation and wherein some of the second channel longitudinal legs are in communication with at least one said first port and others of the second channel longitudinal legs are in communication with at least one said second port independently of the first ports.

In additional or alternative embodiments of any of the foregoing embodiments the method includes, for a third said system, mounting the inner races of the first bearing and second bearing to the shaft in a third relative orientation offset from the first relative orientation wherein: all of the second channel longitudinal legs are in communication with at least one said second port independently of the first ports; and some, but not all, of the first ports are blocked; and in the second relative orientation, none of the first ports are blocked.

Another aspect of the disclosure involves a method for manufacturing a bearing system. The bearing system comprises: an inner race of a first bearing, including a plurality of first ports; an inner race of a second bearing, including a plurality of second ports; a shaft, received by the inner race of the first bearing and the inner race of the second bearing, the shaft having a plurality of outer diameter (OD) channels positioned to cooperate with at least the inner race of the first bearing to define passageways. The method comprises: installing the shaft of the bearing system unkeyed into the inner race of the first bearing and inner race of the second bearing in an installed orientation wherein: at least one of the passageways extends from an associated inlet port to communicate with at least one of the first ports; and at least one of the passageways extends from an associated inlet port to communicate with at least one of the second ports; and regardless of said installed orientation, at least one of the second ports are in communication with at least one said inlet port independently of all the first ports.

In additional or alternative embodiments of any of the foregoing embodiments: in at least a first said installed orientation, some, but not all, of the first ports are blocked; and in at least one other installed orientation, none of the first ports are blocked.

Another aspect of the disclosure involves a method for using a bearing system. The method comprises: delivering pressurized lubricant to a shoulder region of a shaft to pass into passageways formed by outer diameter (OD) channels and a first bearing inner race and a second bearing inner race to pass to first ports in the first bearing inner race and second ports in the second bearing inner race.

The details of one or more embodiments are set forth in the accompanying drawings and the description below. Other features, objects, and advantages will be apparent from the description and drawings, and from the claims.

BRIEF DESCRIPTION OF THE DRAWINGS

Like reference numbers and designations in the various drawings indicate like elements.

DETAILED DESCRIPTION

Figure 1:
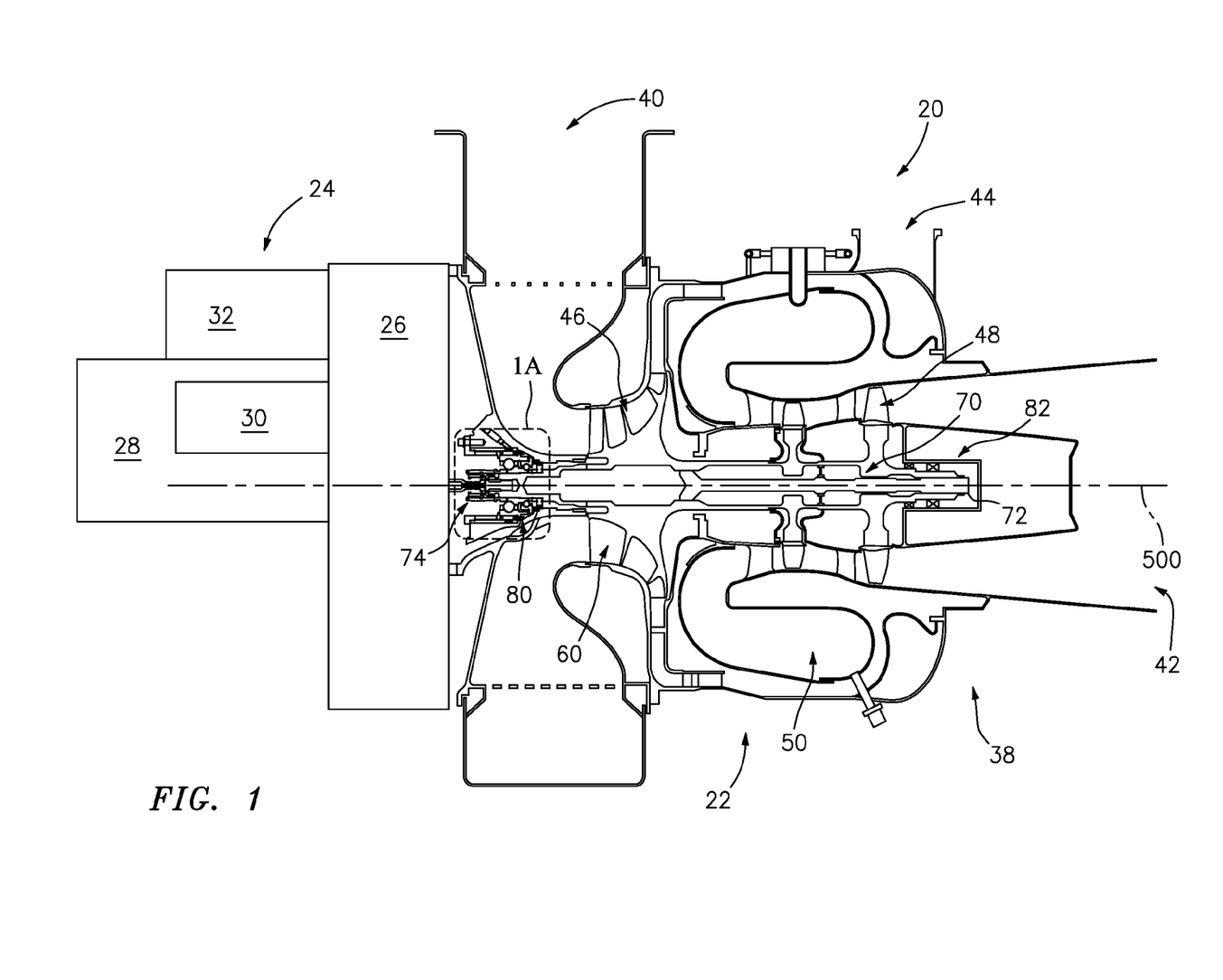
FIG. 1 is a partially schematic longitudinal sectional view of an auxiliary power unit including a gas turbine engine.

FIG. 1 shows a system 20 comprising a gas turbine engine 22 for driving a load 24. The exemplary system 20 is an auxiliary power unit (APU) for an aircraft. The exemplary APU drives the load 24 via a transmission 26. The exemplary load includes a generator 28 and an oil pump 30. A starter 32 is also coupled to the transmission. The exemplary engine includes a case 38 having an air inlet 40 and an exhaust outlet 42. For APU use, the exemplary engine case 38 also includes a bleed outlet 44 for providing bleed air to the aircraft.

The exemplary engine 22 is a single-spool engine. The exemplary engine includes a centrifugal compressor 46 and an axial turbine 48 downstream of the compressor along a main flowpath from the inlet 40 to the outlet 42. Along the main flowpath between the compressor and turbine is a combustor 50 for introducing fuel to the air and combusting it to generate gas for delivery to the turbine. The bleed outlet 44 is approximately adjacent the combustor along the flowpath.

The exemplary engine has a centerline or central longitudinal axis 500 about which the compressor and turbine rotating portions rotate. The compressor rotating portion comprises a multi-vane impeller 60. The exemplary impeller has an axial inlet and a radial outlet. The exemplary axial turbine has multiple (e.g., two) stages of blades interspersed with stages of vanes. The blades are mounted on disks which form a portion of a shaft assembly 70 of the engine extending between an aft end 72 and a forward end 74. The shaft assembly is supported for rotation relative to the housing 38 by one or more bearing systems which mount the shaft to the housing. FIG. 1 shows one or more forward bearing systems 80 and one or more aft bearing systems 82. In the exemplary embodiment, the forward and aft bearing systems are each duplex bearings with the forward bearing system being a duplex ball bearing system and the aft bearing system being a duplex roller bearing system.

Figure 1A:
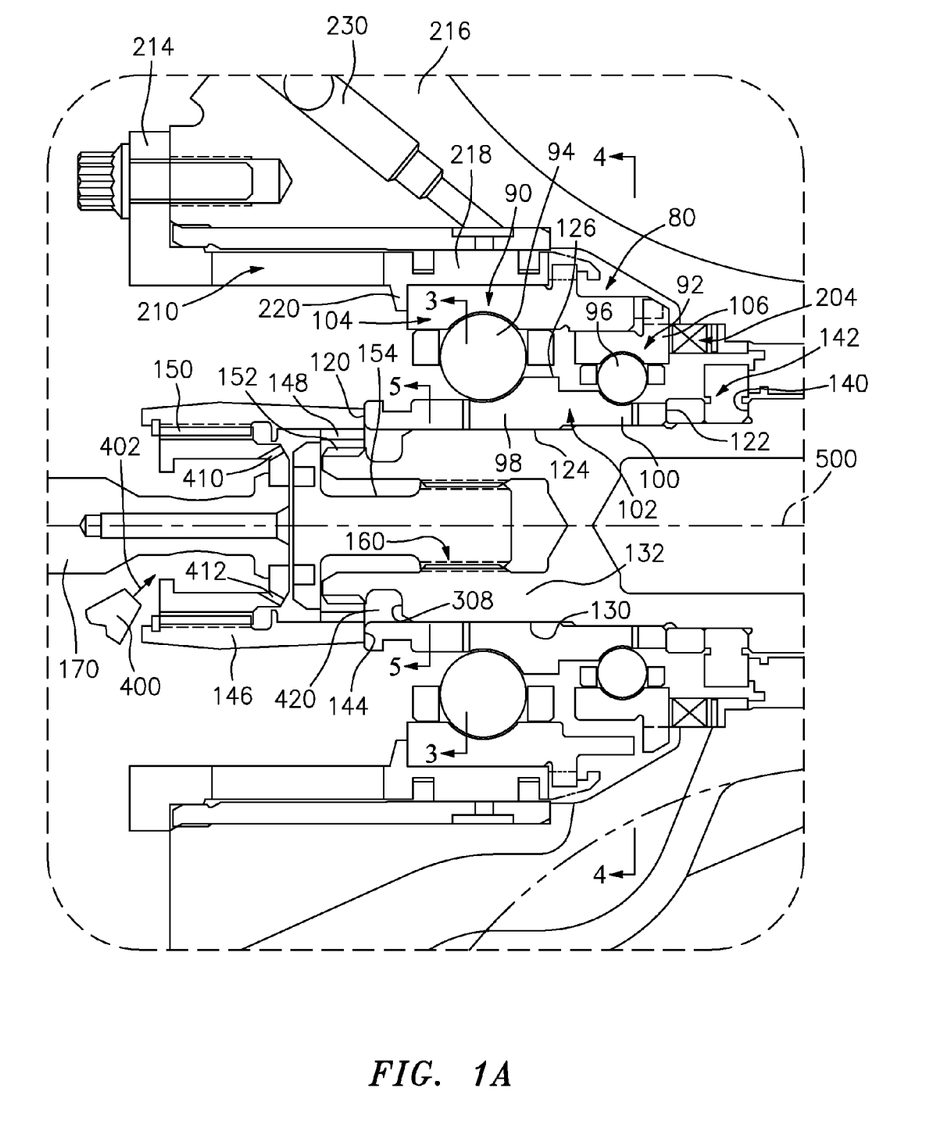
FIG. 1A is an enlarged view of a duplex bearing of the engine of FIG. 1.

FIG. 1A shows further details of the exemplary duplex bearing 80. The duplex bearing 80 comprises a first bearing 90 and a second bearing 92. The first bearing 90 comprises a circumferential array of rolling bearing elements 94 (in this case balls but other types bearing elements (e.g., straight roller, tapered roller, and the like) may be used as would be understood by one of ordinary skill in the art). The second bearing 92 similarly comprises an array of rolling bearing elements 96 (e.g., also balls). Each of the bearings 90 and 92 comprises an inner race and an outer race. The exemplary inner races are formed as respective portions 98 and 100 of an inner member 102. The exemplary outer races are formed by separate pieces 104 and 106. The exemplary inner member 102 comprises a single piece extending from a forward end/rim 120 to an aft end/rim 122 and has an inboard or inner diameter (ID) surface 124 and an outboard or outer diameter (OD) surface 126. The exemplary OD surface 126 includes portions for contacting the balls 94 and 96.

The exemplary ID surface 124 is installed (in this embodiment press-fit) onto the outer diameter (OD) surface 130 of a forward portion of a forward shaft member 132 (shaft) of the shaft assembly ahead of and secured to the impeller. The inner member 102 is axially retained against a shoulder 140 of the shaft 132 (e.g., via an intervening seal runner 142 between the shoulder 140 and the end/rim 122). In the exemplary engine, the inner member 102 is held under compression via its forward end 120. In this embodiment, the forward end 120 abuts the aft end 144 of a spline coupling 146. The exemplary spline coupling has an aft internal spline 148 and a forward internal spline 150. The aft internal spline 148 is engaged to a forward external spline 152 of the shaft 132. A bolt 154 is threaded into a complementary internally threaded bore 160 in the shaft 132 with its head underside biasing the aft internal spline 148 rearward to, in turn, bias the aft rim 144 against the inner member 102 front rim 120.

As is discussed further below, a quill shaft 170 (drive shaft) of the transmission 26 has an external spline engaged to the internal spline 150 of the spline coupling to allow the engine to transmit torque to the transmission to drive the load.

Figure 1B:
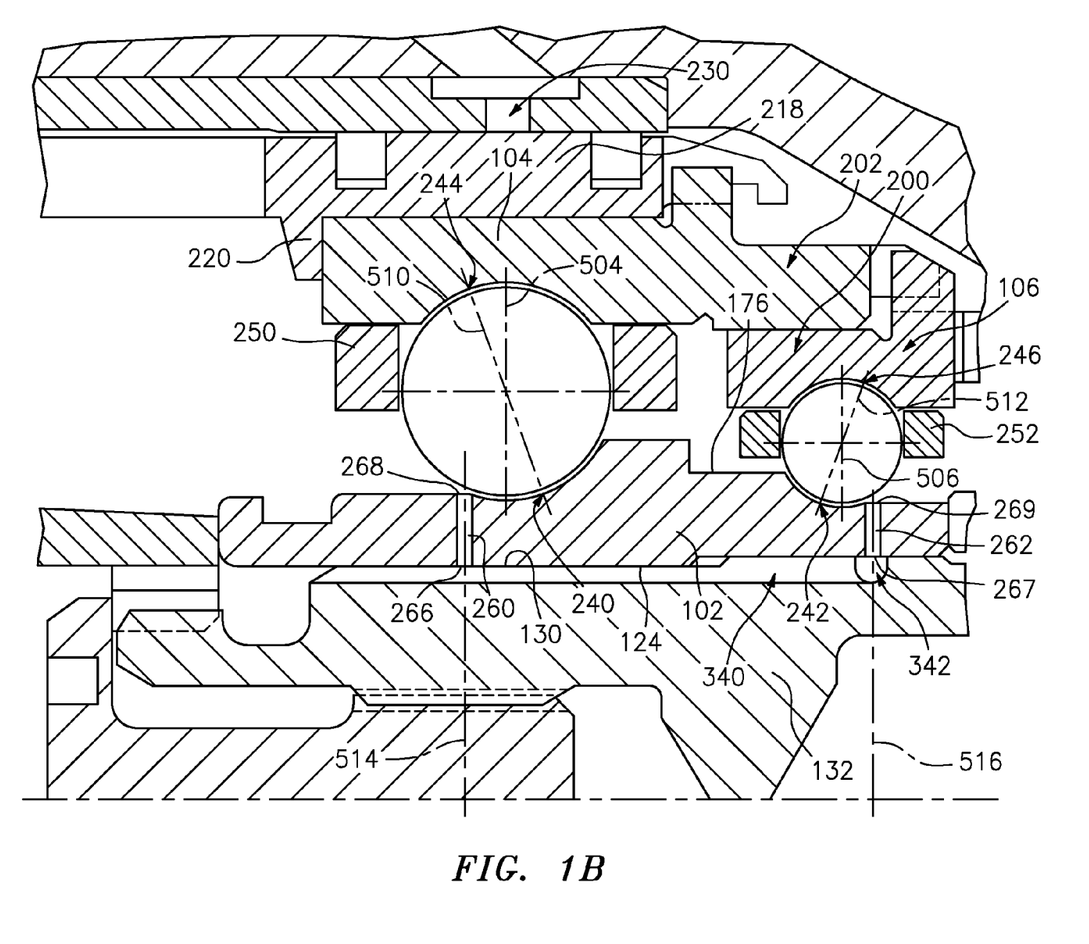
FIG. 1B is a further enlarged view of the duplex bearing.

FIG. 1B shows the exemplary bearing outer races in further detail. The second bearing outer race 106 has a forward portion 200 received in sliding engagement with an aft portion 202 of the first bearing outer race 104. A wave spring assembly 204 (FIG. 1A) biases an aft end of the second bearing outer race 106 forwardly so as to bias the two outer races toward each other to facilitate carrying of thrust/counter-thrust loads. Forward movement of the first bearing outer race is restrained by a squirrel cage retainer 210. The exemplary retainer 210 has a forward flange 214 bolted to an air inlet housing portion 216 of the housing 38. The squirrel cage has an aft portion 218 having an ID surface receiving an OD surface of the first bearing outer race 104. The aft portion 218 includes an inwardly protruding stop member 220 abutting a forward rim of the first bearing outer race 104 to restrain its forward movement. Small axial excursions of the first bearing outer race 104 are permitted but damped by pressurized oil introduced through a damper passageway 230.

FIG. 1B shows further details of the bearings. To allow the duplex bearing 80 to take both thrust and counter-thrust, the first and second bearings have oppositely inclined load paths 510 and 512. The load paths extend between respective inner race contact points 240, 242 and outer race contact points 244 and 246. The centers of the first bearing balls 94 define a first bearing centerplane 504 while the second bearing ball 96 centers define a second bearing centerplane 506.

The exemplary first and second bearings have respective retainer cages 250 and 252. To lubricate the bearings, lubrication passageways are formed by the combination of the shaft 132 and the inner member 102. The exemplary passageways include ports 260 for delivering lubricant (e.g., oil) to the first bearing and ports 262 for delivering lubricant to the second bearing. The exemplary ports extend from the ID surface 124 of the inner member 102 to the OD surface 126 of the inner member. Exemplary ports 260 and 262 each have ID inlets 266, 267 and OD outlets 268, 269. For ease of illustration, FIG. 1 shows ports 260 and 262 cut by the same plane. However, the exemplary embodiment circumferentially offsets these ports as is reflected in FIGS. 3-5 discussed below.

Figure 2:
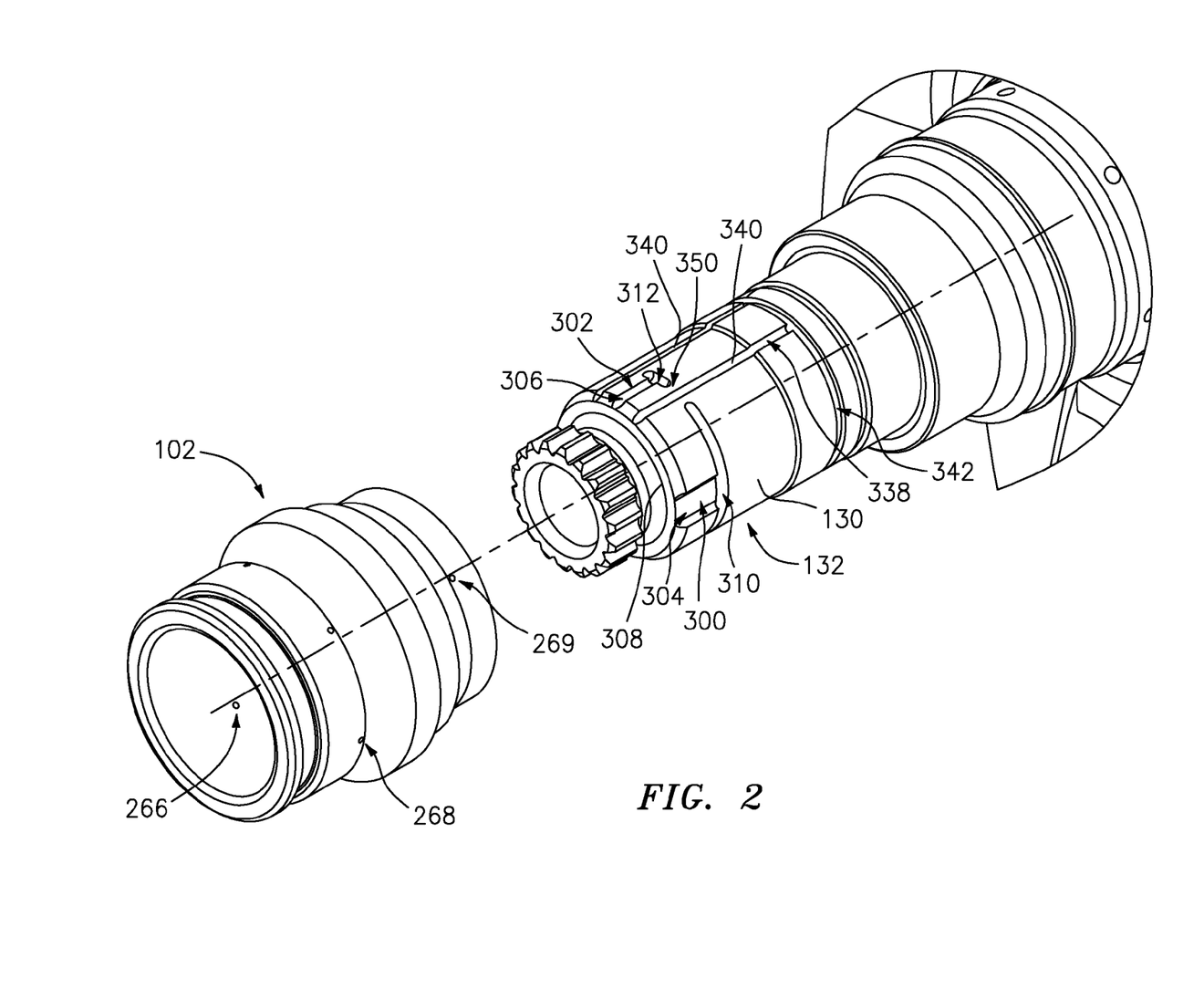
FIG. 2 is an exploded view of a bearing inner race and a shaft.
Figure 5:
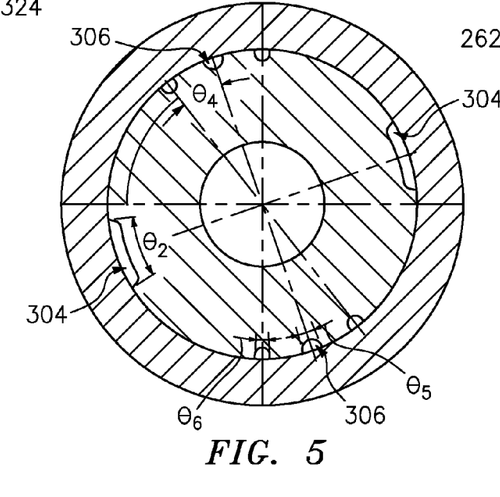
FIG. 5 is a sectional view of an inner race of the first bearing in the first installation orientation, taken along line 5-5 of FIG. 1A.

The exemplary ports 260 and 262 are formed as radial holes (e.g., drilled, cast, or otherwise formed) so that their inlets and outlets fall along respective planes (transverse center planes) 514 and 516. In the exemplary embodiment, the plane 514 and its associated outlets 268, 269 are forwardly offset from the plane 504 while the plane 516 and its associated outlets 268, 269 are rearwardly offset relative to the plane 506. Thus, the first port outlets 268 and second port outlets 269 are respectively axially outboard of the associated planes 514 and 516. The ports 260 and 262 are fed by passageways formed by a combination of channels in the OD surface 130 cooperating with the ID surface 124. FIG. 2 shows these channels. For feeding the first bearing, FIG. 2 shows a channel 300 and a channel 302. The exemplary channels 300 and 302 have respective longitudinal legs 304, 306 extending aft from a shoulder 308 (an external shoulder, FIG. 1A) of the shaft 132. The longitudinal legs 304 and 306 intersect respective circumferential legs 310 and 312. As is discussed further below, the legs 312 and 306 are of relatively shorter circumferential span than the legs 310 and 304. In the exemplary embodiment, there are two channels 300 diametrically opposite each other and two channels 302 diametrically opposite each other (and offset by 90° from the channels 300). FIG. 5 shows this diametric opposite orientation of the longitudinal legs with the channels 302 90° offset from adjacent channels 300.

Figure 3:
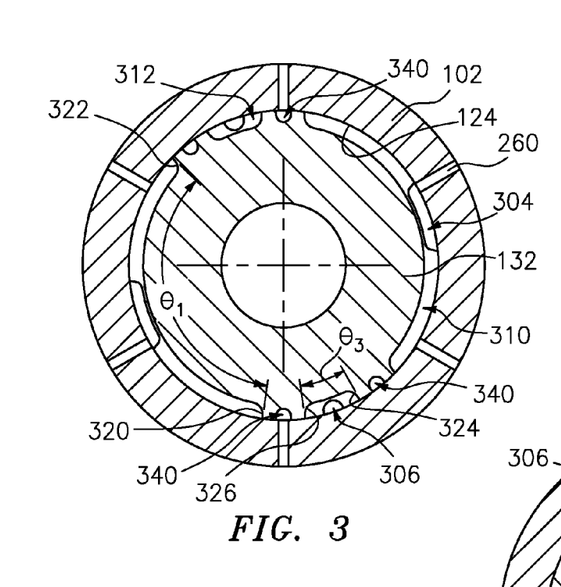
FIG. 3 is a sectional view of the first bearing of the duplex in a first installation orientation, taken along line 3-3 of FIG. 1A.

FIG. 3 shows the circumferential legs 310 as extending between first and second circumferential ends 320 and 322 and the circumferential legs 312 as extending between first and second circumferential ends 324 and 326.

Figure 4:
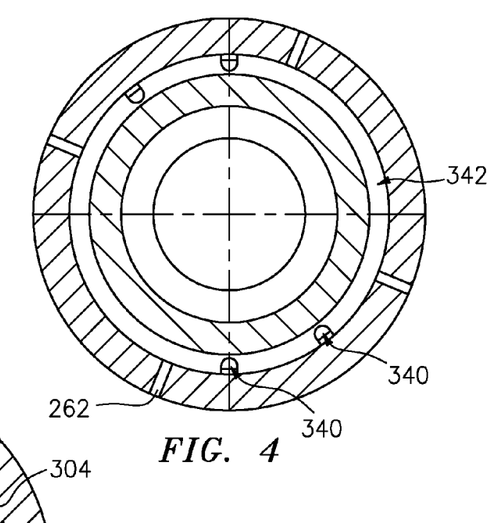
FIG. 4 is a sectional view of the second bearing of the duplex in the first installation orientation, taken along line 4-4 of FIG. 1A.

Returning to FIG. 2, a second channel 338 comprises a series of longitudinal legs 340 passing aft from the shoulder 308 through gaps between the circumferential legs 310 and 312 (e.g., between adjacent circumferential ends of such legs). The illustrated longitudinal legs 304, 306 are shorter than the longitudinal legs 340. The longitudinal legs 340 intersect one or more circumferential legs (in this case, a single full annulus circumferential leg 342). FIG. 4 shows the intersections of the legs 340 with the full annulus leg 342.

As is discussed further below, a flow of lubricant (e.g., oil) is introduced proximate the shoulder 308 of FIG. 2 to inlets of the passageways formed by the channels. Oil 402 may be introduced through a nozzle 400 (FIG. 1A). The oil may pass through ports 410, 412 in the aft head of the quill shaft 170 and then within the spline coupling between the teeth of the interfitting splines 148 and 152. It may then pass to an annular plenum 420 at the shoulder 308 to feed the passageways. One or more of the passageways formed by the channels 300 and 302 may deliver oil to one or more of the first bearing ports 260. Similarly, the passageways formed by the channel 338 delivers oil to at least some of the second bearing ports 262. The exemplary shaft 132 and inner member/inner race 102 have no keying means for orienting them in a predetermined orientation. It is therefore desirable that the passageways/channels be configured to provide sufficient oil delivery both to the ports 260 and to the ports 262. This can be associated with several properties. First, at least some of the inlets of the ports 260 should fall along (be open/exposed/communicating to) the channels 310 or 312 and not blocked by intact portions 350 (FIG. 2) of the cylindrical OD shaft surface therebetween.

Second, it is similarly desirable that at least some of the second bearing port 262 inlets 267 fall along (be open/exposed/communicating to) the circumferential leg 342. In the case of the full annulus circumferential leg 342, this will always be achieved. However, the presence of a full annulus circumferential leg 342 raises an additional concern. If one of the longitudinal legs 340 happens to be exposed to one of the inlets of a first bearing port 260, oil delivered into the associated passageway along that leg 340 will go to the first bearing and not go to the second bearing. Thus, at least some of the legs 340 do not intersect (be open/exposed/communicating to) the inlet 266 to a first bearing port 260 regardless of orientation.

Thus, the channels 300 and 302 are positioned to potentially feed the first bearing ports. By "potentially" it is meant that in the installed relative axial position of bearing inner race and shaft, if at the correct angular orientation, such channel will feed such port. Similarly, the legs 340, in cooperation with the leg 342, are positioned to potentially feed one or more of the second ports. The exemplary configuration, however, further provides that regardless of such installed orientation (e.g., along the full 360° continuum of possible relative orientations) at least some of the channels 300 and 302 will be positioned to feed the first ports and at least some of the legs 340 feed the leg 342 (and thus the second ports) while a flowpath to at least one such second port does not intersect one of the first ports.

When the channel 342 is replaced by multiple separate segments, at least some of their associated longitudinal legs would not intersect a first bearing port 260 inlet 266 while, at the same time, the circumferential leg associated with such non-intersecting longitudinal leg would intersect at least one of the second bearing port 262 inlets 267.

FIGS. 3-13 show various possible relative orientations of the shaft 132 and bearing inner member 102. The exemplary first bearing has six ports 260 (FIG. 3). In this FIGS. 3-5 scenario (the particular installation situation or relative orientation of shaft 132 and inner member 102), two of the ports 260 are each open to an associated one of the circumferential legs 310. Both circumferential legs 312 and their associated passageways are blocked by the intact cylindrical ID surface 124 of the inner member 102. However, in this scenario two of the legs 340 are aligned with the remaining two ports 260. Thus, oil delivered through those two legs will pass to the first bearing and not to the second (at least not in substantial quantity). However, the other two legs 340 are blocked at the first bearing by the intact inner surface 124. Thus, their oil will continue to pass to the circumferential leg 342 (FIG. 4). Thus, these two legs will feed the ports 262 independently of the first bearing (i.e., the oil flowpath to the ports 262 through those legs 340 would not have to first branch off (in the leg 340) of a flowpath to the first bearing ports 260).

Figure 6:
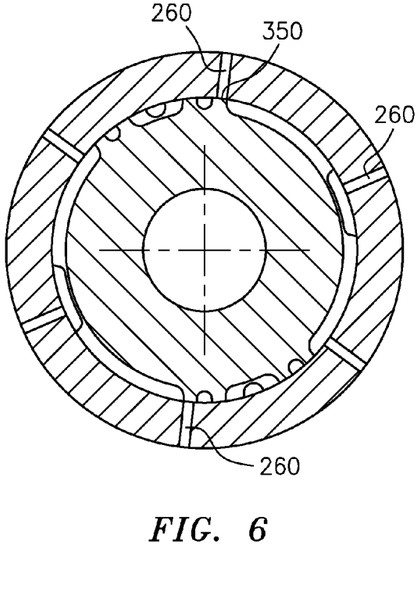
FIG. 6 is a sectional view of the first bearing of the duplex in a second installation orientation, taken along line 3-3 of FIG. 1A.
Figure 7:
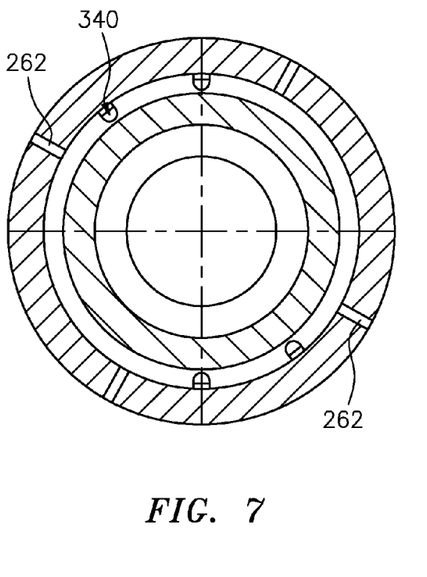
FIG. 7 is a sectional view of the second bearing of the duplex in the second installation orientation, taken along line 4-4 of FIG. 1A.

FIGS. 6 and 7 represent a slightly different scenario/situation/orientation wherein intact cylindrical portions 350 of the surface 124 at the end of the legs 310 block two of the ports 260. However, each of those legs 310 is in communication with an associated two of the ports 260 so that oil passes through four of the six ports. Again, in this situation, the passageways associated with the legs 312 are blocked and do not deliver oil. The introduction of lubrication through two of the channels and four of the ports 260 is thoroughly satisfactory. In this example, all four legs 340 deliver oil to the circumferential leg 342 so that the second bearing gets its maximal oil delivery.

Figure 8:
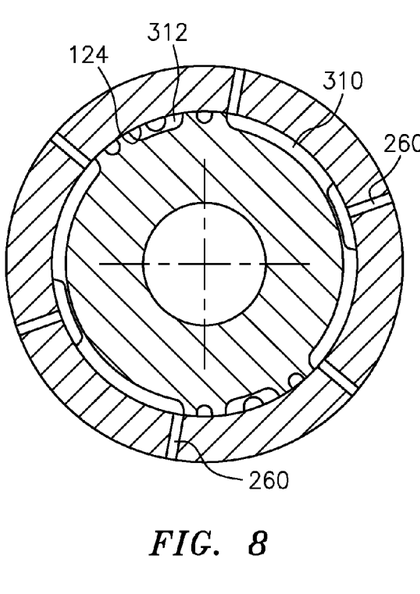
FIG. 8 is a sectional view of the first bearing of the duplex in a third installation orientation, taken along line 3-3 of FIG. 1A.
Figure 9:
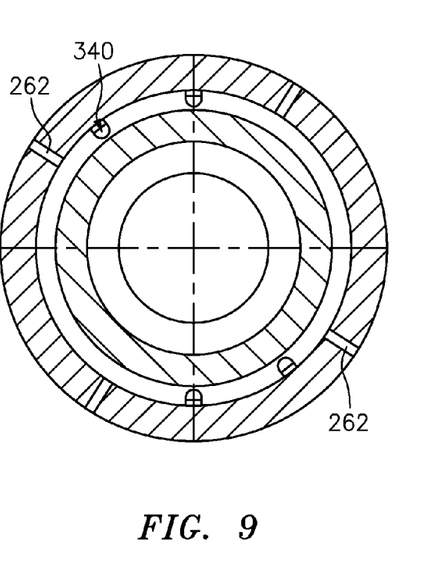
FIG. 9 is a sectional view of the second bearing of the duplex in the third installation orientation, taken along line 4-4 of FIG. 1A.

FIGS. 8 and 9 show an alternate scenario wherein, again, the legs 312 are both blocked by the intact ID surface 124. However, in this case, each of the legs 310 is open to three of the ports 260 so that all six ports 260 receive oil. The oil delivery through two of the legs to all six ports is satisfactory. In this scenario, none of the legs 340 is exposed to the ports 260. Thus, this, too, represents a maximal lubrication for the second bearing with oil delivered to all of the ports 262 (and via all channels 340) independently of the ports 260.

Figure 10:
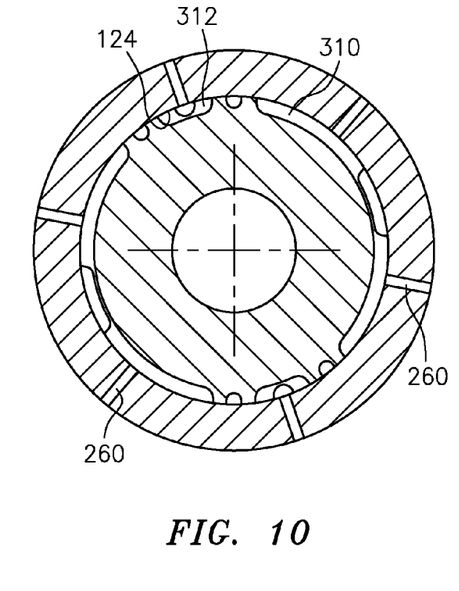
FIG. 10 is a sectional view of the first bearing of the duplex in a fourth installation orientation, taken along line 3-3 of FIG. 1A.
Figure 11:
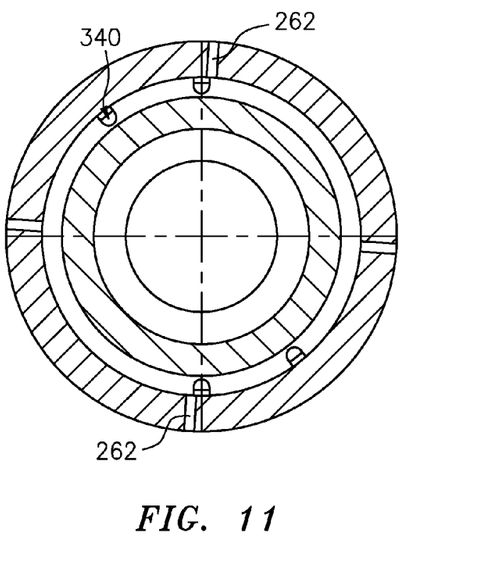
FIG. 11 is a sectional view of the second bearing of the duplex in the fourth installation orientation, taken along line 4-4 of FIG. 1A.

FIGS. 10 and 11 represent another scenario wherein each of the legs 312 is open to an associated one of the ports 360. Each of the legs 310 is exposed to two associated ports 260. Thus, all ports 260 receive oil and both sets of channels 300, 302 deliver oil and this represents a maximal oil condition with all passageway legs 304, 306 delivering oil to the first bearing. Similarly, none of the legs 340 is exposed to ports 260. Therefore, all ports 262 receive oil independent of the ports 260 representing a maximal oil condition for the second bearing too.

Figure 12:
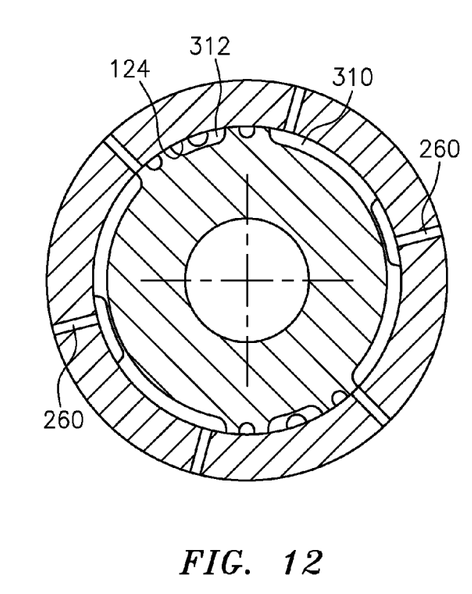
FIG. 12 is a sectional view of the first bearing of the duplex in a fifth installation orientation, taken along line 3-3 of FIG. 1A.
Figure 13:
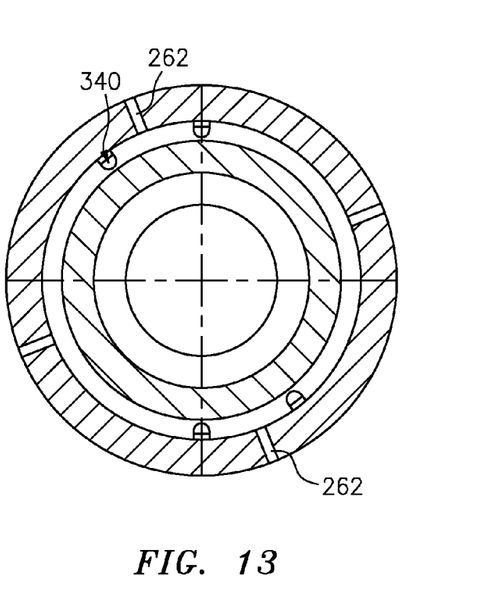
FIG. 13 is a sectional view of the second bearing of the duplex in the fifth installation orientation, taken along line 4-4 of FIG. 1A.

FIGS. 12 and 13 represent a further alternative situation otherwise similar to the FIGS. 6 and 7 situation. Other alignments may cause slightly different oil delivery conditions. However, it is seen that the exemplary configuration delivers oil to at least four of six ports 260 and delivers oil through at least two legs 340 independently of the first bearing.

In this implementation, an annular span of the legs 310 (FIG. 3) is shown as $\theta_1$. An angular span of the legs 312 is shown as $\theta_3$. An angular span of the leg 304 is shown as $\theta_2$. An angular offset between the legs 306 and the adjacent legs 340 is shown as $\theta_4$. An exemplary angular span of the leg 306 is show as $\theta_5$. An exemplary angular span of the legs 340 is shown as $\theta_6$. Exemplary $\theta_1$ is in excess of 100° but less than 150° (e.g., 120°-130° or about 125.6°). Exemplary $\theta_2$ is 15-40° (e.g., 20°-30° or about 260°). Exemplary $\theta_3$ is 10°-30° (more narrowly, 15°-25° or about 21.6°). Exemplary $\theta_4$ is 15°-25° (more narrowly, 17°-22° or about 190°). Exemplary $\theta_5$ is 3°-15° (more narrowly, 5°-10° or about 7.4°). Exemplary $\theta_6$ is 2°-12° (more narrowly, 3°-8° or about 6.0°). The physical constraints on $\theta_3$ and $\theta_1$ are that their sum plus the sum of the $\theta_6$ values for those of the channels 340 and adjacent intact portions total 180°. $\theta_2$ is selected merely to provide sufficient feeding for the associated circumferential leg 310. Similarly, $\theta_5$ is selected to be sufficient to feed the associated circumferential leg 312. $\theta_6$ is selected to appropriately feed the circumferential leg 342.

Exemplary depth of the channels may be approximately the same and may be an exemplary about 0.062 inch (1.6 mm), more broadly, 1.0-4.0 mm (more narrowly, 1.2-2.0 mm).

One or more embodiments have been described. Nevertheless, it will be understood that various modifications may be made. For example, while shown supporting a rotating shaft relative to a non-rotating housing, other combinations may be possible (e.g., supporting one rotating shaft relative to another, supporting a rotating structure on a fixed shaft, and the like). While a single member inner race and two-member outer race is illustrated, other combinations may be possible. This might include integrating at least the outer race with a larger portion of the housing or other structure. While illustrated in the context of a turbine engine, non-engine uses are possible. When implemented as a modification of a baseline engine (or other system) configuration, details of the baseline may influence details of any particular implementation. Accordingly, other embodiments are within the scope of the following claims.

What is claimed is:

1. A bearing system comprising:
a first bearing having an inner race;
a second bearing having an inner race; and
a shaft, received by the inner race of the first bearing and the inner race of the second bearing,
wherein:
the inner race of the first bearing includes a plurality of first ports;
the inner race of the second bearing includes a plurality of second ports;
the shaft is insertable into the inner race of the first bearing and the inner race of the second bearing in a plurality of installed orientations;
the shaft has a plurality of outer diameter (OD) channels positioned to cooperate with at least the inner race of the first bearing to define passageways;
the OD channels comprise:
at least one first channel dimensioned to potentially feed one or more of the first ports; and
at least one second channel dimensioned to potentially feed one or more of the second ports and one or more of the first ports;
at least some of the passageways extend aft from an associated inlet port to communicate with at least one of the first ports and at least one of the second ports; and
regardless of said installed orientation, at least one of the second ports are in communication with at least one said inlet port along a flowpath bypassing all the first ports.

2. The system of claim 1 wherein:
the inner race of the first bearing and the inner race of the second bearing are portions of a single piece.

3. The system of claim 1 wherein:
the first bearing includes an outer race and a plurality of bearing elements between the outer race of the first bearing and the inner race of the first bearing; and
the second bearing includes an outer race and a plurality of bearing elements between the outer race of the second bearing and the inner race of the second bearing.

4. The system of claim 3 wherein:
the first bearing outer race and the second bearing outer race are separate pieces.

5. The system of claim 4 wherein:
the first bearing outer race and second bearing outer race are biased toward each other.

6. The system of claim 3 wherein:
the first bearing bearing elements are balls; and
the second bearing bearing elements are balls.

7. The system of claim 1 wherein:
the first ports have outlets axially outboard of a transverse centerplane of the first bearing bearing elements; and
the second ports have outlets axially outboard of a transverse centerplane of the second bearing bearing elements.

8. The system of claim 1 wherein:
the passageways extend from an inlet plenum at a shoulder of the shaft.

9. The system of claim 1 wherein the OD channels comprise:
a plurality of first bearing longitudinal legs;
a plurality of first bearing circumferential legs intersecting respective associated first bearing longitudinal legs;
a plurality of second bearing longitudinal legs; and
at least one second bearing circumferential leg intersecting the second bearing longitudinal legs.

10. The system of claim 9 wherein:
the plurality of first bearing circumferential legs are partial annuli; and
the plurality of second bearing longitudinal legs pass between associated pairs of the first bearing circumferential legs.

11. The system of claim 10 wherein:
the plurality of first bearing circumferential legs comprise at least two different angular spans.

12. The system of claim 9 wherein:
the second bearing circumferential leg is a full annulus.

13. The system of claim 9 including six first ports evenly circumferentially spaced.

14. The system of claim 9 including four second bearing circumferential legs.

15. The system of claim 9 wherein:
the first beating longitudinal legs are shorter than the second bearing longitudinal legs.

16. An engine comprising:
an engine case; and
the system of claim 1 wherein the shaft is an engine shaft and the first bearing and second bearing mount the shaft to the case for rotation about an engine axis.

17. The engine of claim 16 wherein:
the bearing system is at a forward end of the engine and the engine further comprises one or more additional bearings aft thereof.

18. The engine of claim 16 wherein:
the bearing system is at a forward end of the engine; and
the passageways extend from a plenum proximate a connection to a coupling between the shaft and a load.

19. A method for using the system of claim 1, the method comprising:
delivering pressurized lubricant to a shoulder region of the shaft to pass into passageways formed by the OD channels and first bearing inner race and second bearing inner race to pass to the first ports and second ports.

20. The method of claim 19 wherein:
the system is a duplex bearing system of a gas turbine engine, the method further comprising running the gas turbine engine to drive rotation of a rotor containing the shaft about an engine axis.

21. The system of claim 1 wherein:
the at least one second channel comprises at least one circumferential leg and at least one longitudinal leg.

22. The system of claim 21 wherein:
said at least one first channel is dimensioned to not be able to potentially feed any of the second ports.

23. A method for manufacturing a plurality of the systems of claim 1, the method comprising:
for a first said system, mounting the inner races of the first bearing and second bearing to the shaft in a first relative orientation wherein all of the second ports are in communication with the second channels and none of the first ports are and all of the first ports are in communication with the first channels and none of the second ports are; and for a second said system, mounting the inner races of the first bearing and second bearing to the shaft in a second relative orientation offset from the first relative orientation wherein:
- some of the second channel longitudinal legs are in communication with at least one said first port; and
- others of the second channel longitudinal legs are in communication with at least one said second port independently of the first ports.

24. The method of claim 23 wherein:

for a third said system, mounting the inner races of the first bearing and second bearing to the shaft in a third relative orientation offset from the first relative orientation wherein:
- all of the second channel longitudinal legs are in communication with at least one said second port independently of the first ports; and
- some, but not all, of the first ports are blocked; and
- in the second relative orientation, none of the first ports are blocked.

25. A method for manufacturing a bearing system, the bearing system comprising:
- an inner race of a first bearing, including a plurality of first ports;
- an inner race of a second bearing, including a plurality of second ports; and
- a shaft, received by the inner race of the first bearing and the inner race of the second bearing, the shaft having a plurality of outer diameter (OD) channels positioned to cooperate with at least the inner race of the first bearing to define passageways, the method comprising:
- installing the shaft unkeyed into the inner race of the first bearing and inner race of the second bearing in an installed orientation wherein:
  - at least one of the passageways extends from an associated inlet port to communicate with at least one of the first ports;
  - at least one of the passageways extends from an associated inlet port to communicate with at least one of the second ports;
  - in at least a first said installed orientation, some, but not all, of the first ports are blocked; and
  - regardless of said installed orientation, at least one of the second ports is in communication with at least one said inlet port independently of all the first ports.

26. The method of claim 25 wherein:
in at least a second said installed orientation, none of the first ports are blocked.

27. A bearing system comprising:
a first bearing having an inner race;
a second bearing having an inner race; and
a shaft, received by the inner race of the first bearing and the inner race of the second bearing, wherein:
- the inner race of the first bearing includes a plurality of first ports;
- the inner race of the second bearing includes a plurality of second ports;
- the shaft is insertable into the inner race of the first bearing and the inner race of the second bearing in a plurality of installed orientations;
- the shaft has a plurality of outer diameter (OD) channels positioned to cooperate with at least the inner race of the first bearing to define passageways;
- at least some of the passageways extend from an associated inlet port at an inlet plenum at an external shoulder of the shaft to communicate with at least one of the first ports and at least one of the second ports; and
- regardless of said installed orientation, at least one of the second ports are in communication with at least one said inlet port along a flowpath bypassing all the first ports.

* * * * *